No. 882,183. PATENTED MAR. 17, 1908.
H. L. WELLS.
COFFEE POT.
APPLICATION FILED JUNE 10, 1907.

2 SHEETS—SHEET 1.

No. 882,183. PATENTED MAR. 17, 1908.
H. L. WELLS.
COFFEE POT.
APPLICATION FILED JUNE 10, 1907.
2 SHEETS—SHEET 2.
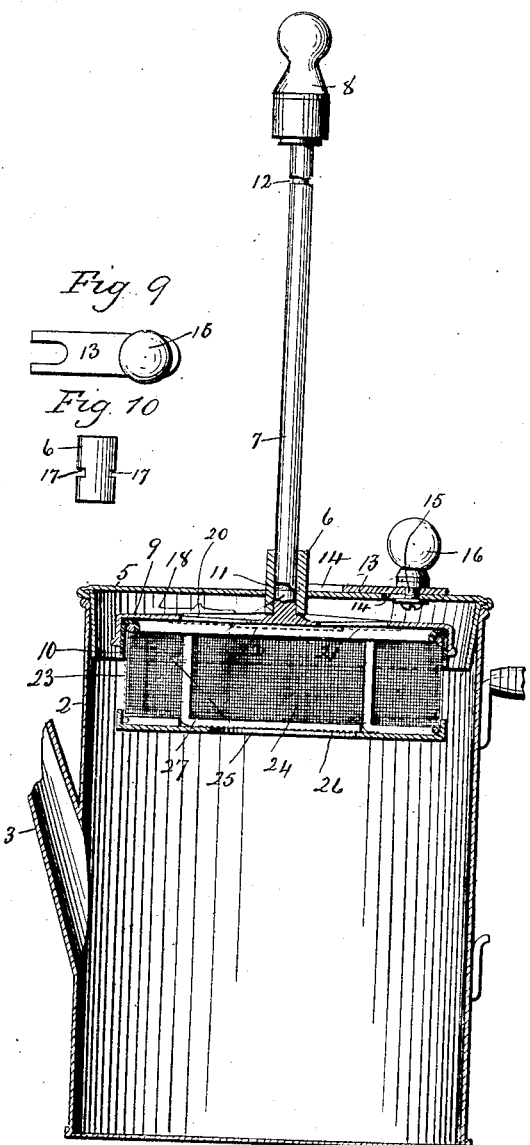

UNITED STATES PATENT OFFICE.

HORACE L. WELLS, OF NEW HAVEN, CONNECTICUT.

COFFEE-POT.

No. 882,183.  Specification of Letters Patent.  Patented March 17, 1908.

Application filed June 10, 1907. Serial No. 378,168.

*To all whom it may concern:*

Be it known that I, HORACE L. WELLS, a citizen of the United States, residing at New Haven, in the county of New Haven and State of Connecticut, have invented a new and useful Improvement in Coffee-Pots; and I do hereby declare the following, when taken in connection with the accompanying drawings and the letters of reference marked thereon, to be a full, clear, and exact description of the same, and which said drawings constitute part of this specification, and represent, in—

Figure 1:
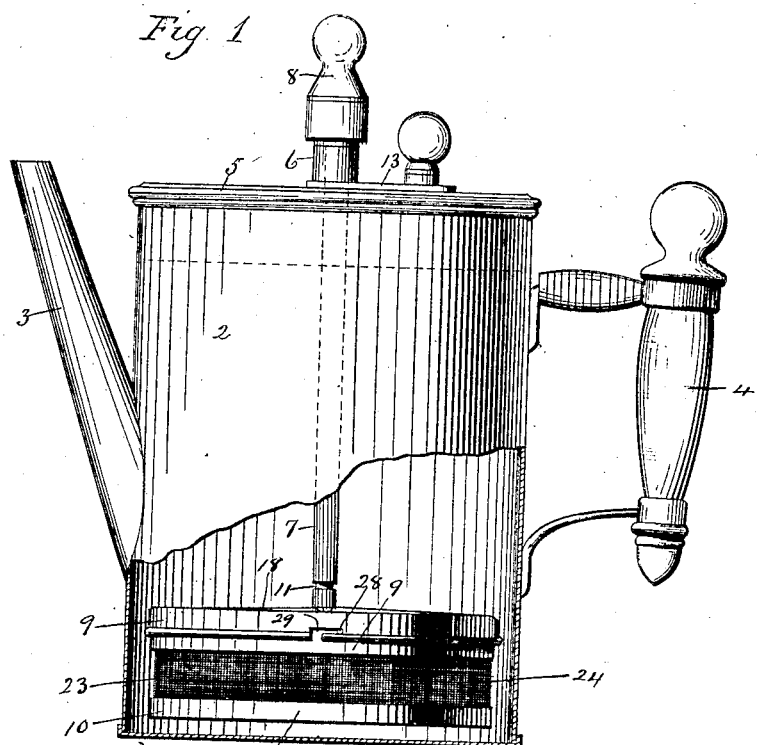
Figure 2:
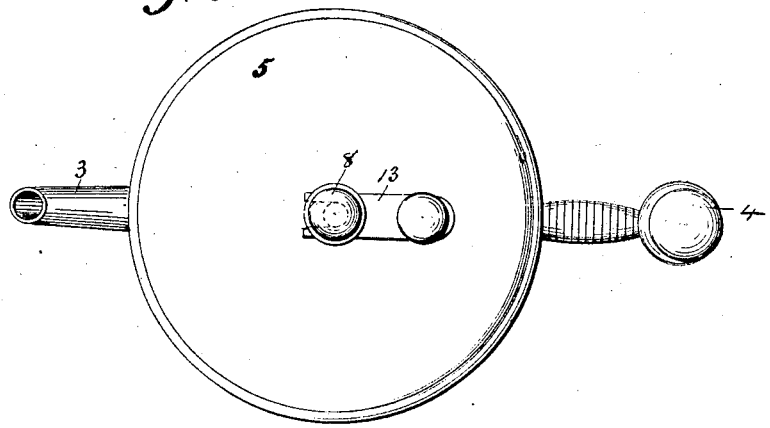

Figure 1 a view in side elevation of a coffee pot constructed in accordance with my invention, a portion of the body of the pot being broken away to show the coffee-container in its lowered position. Fig. 2 a plan view of the coffee pot. Fig. 3 a broken view thereof in vertical section,s howing the coffee-container in its elevated position. Fig. 4 a detached view in side elevation of the cap of the coffee-container. Fig. 5 a plan view thereof. Fig. 6 a reverse plan view thereof. Fig. 7 a detached view in side elevation of the coffee-container body. Fig. 8 a reverse plan view thereof. Fig. 9 a detached plan view of the locking-plate. Fig. 10 a similar view of the slotted bearing collar.

My invention relates to an improvement in coffee pots, the object being to produce a coffee pot operating on scientific principles and constructed with particular reference to simplicity and durability of construction, ease of comprehension, convenience of use, and to adaptation to the making of coffee in several different ways without extracting the tannic acid from the coffee.

With these ends in view my invention consists in a coffee pot having certain details of construction as will be hereinafter described and pointed out in the claims.

In carrying out my invention as herein shown, I employ a cylindrical body 2 having a spout 3 and handle 4 of any approved construction and furnished with a cover 5 provided with a centrally arranged collar 6 forming a suspension bearing for a vertically movable and rotary spindle 7 furnished at its upper end with a knob-like handle 8 and carrying at its lower end the disk-like cap 9 of a cylindrical coffee-container also comprising a shallow cylindrical container-body 10, relatively large as compared with the cylindrical body 2 of the pot so as to secure the full value of centrifugal force as an aid to extracting the coffee principle from the ground coffee, the larger the coffee-container in diameter the greater being the action of centrifugal force.

Annular grooves 11 and 12 located near the lower and upper ends respectively of the spindle 7 receive the fork-like inner end of a locking-plate 13 radially arranged upon the top of the cover 5 which is furnished with a slot 14 for the reception of a screw 15 passing upward through the slot 14 and through the plate 13 into a knob-like finger-piece 16 by means of which the plate is moved inward and outward into its locking and releasing position. For the entrance of the fork-like inner end of the plate 13 into the grooves 11 and 12, the sides of the collar 6 are formed with slots 17 as shown in Fig. 10. Under this construction the spindle is suspended in the said collar 6 in an elevated or in a depressed position with freedom to be rotated in either position.

The cap 9 of the coffee-container is provided with a star-like reinforce 18 the points of which extend to the edges of the cap and are applied to radial arms 19 produced by cutting the central portion of the cap away to form quadrant-shaped openings 20 for the exposure of a fine wire screen 21 located within the cap and ring-shaped for the reception at its center of a circular wire screen 22 of coarser mesh. This particular construction, however, may be changed according to requirements.

The container-body 10 is cut away to form a circumferential lateral opening 23 occupied by wire cloth 24. The bottom of the container is formed with a central opening 25 closed by a disk of wire cloth 26. By preference and as shown, the body 10 of the container will be reinforced by a wire frame 27 over which its metal portions are bent. The said coffee-container is provided near its upper edge with pins or projections 28 entered into bayonet-slots 29 in the downwardly turned edge of the cap 9. It will be noted that the coffee-container is supported entirely from above—from the cover of the body 2, there being complete clearance or a free space between the bottom of the container and the bottom of the body of the pot. There is therefore nothing to prevent the water in the pot from being sucked directly upward into the coffee-container into the center thereof By constructing the coffee-container as described, it will, when rotated, by twirling the spindle 7, draw in water at its top and bottom and discharge it by centrifugal force through its sides. In this way the water may be drawn quickly through the ground coffee again and again for the extraction therefrom of as much of the coffee principle as desired. On the other hand, the coffee may, if preferred, be made without any rotation of the container, though, as explained, that hastens the making of the coffee. When the infusion has reached the required degree of strength, the spindle 7 is lifted as high as it will go and the locking-plate 13 pushed inward to enter the groove 11 in the lower end of the spindle whereby the coffee-container will be suspended in the elevated position shown in Fig. 3, and there it may be twirled for the extraction of the last drop of the coffee infusion and then left until the time comes for washing the pot. In most, at least, of the modern coffee pots designed to extract only the desirable principles from the coffee, the ground coffee is located at the top of the pot entirely above the water which must be brought to a sharp boil before it will be forced upward through the coffee. In my improved coffee pot, on the other hand, the coffee is immersed in the water during the entire period covered by making the infusion and then lifted out of the water at the moment the infusion has reached the required strength. The infusion may therefore be made at any desired temperature. Thus, the water may be cold when the coffee is immersed in it, and gradually brought to a boil, or the water may be gradually brought near to the boiling point and never allowed to boil before the coffee-container is lifted out of it, or the water may be brought to any desired temperature, or even to the boiling point before the coffee is immersed in it, &c. It will thus be seen that my improved coffee-pot offers a wide range of choice in methods of making coffee; at the same time it provides for conveniently and easily removing the coffee from the infusion just as soon as the same has reached the strength desired.

It is apparent that in carrying out my invention, some changes from the construction herein shown and described may be made. I would therefore have it understood that I do not limit myself thereto but hold myself at liberty to make such departures therefrom as fairly fall within the spirit and scope of my invention.

1. In a coffee pot, the combination with the body and cover thereof, of a rotatable and vertically movable spindle formed at its upper and lower ends respectively with annular grooves for its suspension in the said cover, a coffee-container carried by the lower end of the spindle, and locking means carried by the said cover and co-acting with the said annular grooves in the spindle for suspending the same in its elevated and depressed positions respectively, in the said cover, with freedom to be rotated therein there being a space between the bottom of the container and the bottom of the body when the former is in its depressed position in which it is supported entirely from the said cover.

2. In a coffee pot, the combination with the body and cover thereof, of a slotted collar mounted in and extending above the top of the cover, a vertically movable and rotatable spindle bearing in the said collar formed at its upper and lower ends respectively with annular grooves for its suspension in the same, a coffee-container carried by the lower end of the spindle, and a locking-plate entering the slot in the collar for engagement with the grooves in the spindle for suspending the same in its elevated and depressed positions respectively, in the said cover, with freedom to be rotated in either position there being a space between the bottom of the container and the bottom of the body when the former is in its depressed position in which it is supported entirely from the said cover.

3. In a coffee pot, the combination with the body and cover thereof, of a vertically movable and rotatable spindle having bearing in the center of the said cover, means for suspending the spindle in its elevated and depressed positions respectively, in the said cover, with freedom to be rotated therein, and a coffee-container consisting of a cap fixed to the lower end of the spindle, and a removable container-body attached to the said cap, the cap and container being formed with openings filled with wire cloth and there being a space between the bottom of the container and the bottom of the body when the former is in its depressed position in which it is supported entirely from the said cover.

4. In a coffee pot, the combination with the body and cover thereof, of a vertically movable and rotatable spindle having bearing in the center of the said cover, means for suspending the spindle in its elevated and depressed positions respectively, in the said cover, with freedom to be rotated therein, and a coffee-container consisting of a cap fixed to the lower end of the said spindle, and a container-body removably applied to the said cap, the body being reinforced by a wire frame, and the said cap and body having openings filled with wire cloth.

5. In a coffee pot, the combination with the body and cover thereof, of a vertically movable and rotatable spindle having bearing in the center of the said cover, means for suspending the said spindle in its elevated and depressed positions respectively, in the said cover, with freedom to be rotated therein, and a metal coffee-container carried by the lower end of the spindle, having a foraminous top, bottom and sides, whereby it is adapted to take in water at its top and bottom and discharge it laterally, and made relatively large with respect to the size of the body of the pot to secure the maximum effect of centrifugal force.

6. In a coffee pot, the combination with the body and cover thereof, of a vertically movable and rotatable spindle having bearing in the center of the said cover, means for suspending the spindle at different elevations in the said cover, with freedom to be rotated therein, and a shallow coffee-container carried by the lower end of the spindle and provided with wire cloth in its top, bottom and sides to adapt it to take in water at its top and bottom and discharge it through its sides under the action of centrifugal force.

In testimony whereof, I have signed this specification in the presence of two subscribing witnesses.

HORACE L. WELLS.

Witnesses:
CLARA L. WEED,
GEORGE D. SEYMOUR.